(12) United States Patent
Quellec

(10) Patent No.: US 12,536,784 B2
(45) Date of Patent: Jan. 27, 2026

(54) PREDICTION OF LABELS FOR DIGITAL IMAGES, ESPECIALLY MEDICAL ONES, AND SUPPLY OF EXPLANATIONS ASSOCIATED WITH THESE LABELS

(71) Applicants: UNIVERSITE BRESTBRETAGNE OCCIDENTALE, Brest (FR); INSTITUT NATIONAL DE LA SANTÉ ET DE LA RECHERCHE MÉDICALE (INSERM), Paris (FR)

(72) Inventor: Gwenolé Quellec, Brest (FR)

(73) Assignees: UNIVERSITE BRESTBRETAGNE OCCIDENTALE, Brest (FR); INSTITUT NATIONAL DE LA SANTÉ ET DE LA RECHERCHE MÉDICALE (INSERM), Paris (FR)

( * ) Notice: Subject to any disclaimer, the term of this patent is extended or adjusted under 35 U.S.C. 154(b) by 346 days.

(21) Appl. No.: 18/018,310

(22) PCT Filed: Jul. 21, 2021

(86) PCT No.: PCT/FR2021/051363
§ 371 (c)(1),
(2) Date: Jan. 27, 2023

(87) PCT Pub. No.: WO2022/023646
PCT Pub. Date: Feb. 3, 2022

(65) Prior Publication Data
US 2023/0306731 A1   Sep. 28, 2023

(30) Foreign Application Priority Data

Jul. 28, 2020   (FR) ........................................ 2007935

(51) Int. Cl.
*G06V 10/82*   (2022.01)
*G06V 10/764*   (2022.01)

(52) U.S. Cl.
CPC ............ *G06V 10/82* (2022.01); *G06V 10/764* (2022.01)

(58) Field of Classification Search
CPC ...... G06V 10/82; G06V 10/764; G06V 20/70; G06N 3/045; G06N 3/0455; G06T 7/11; G06T 7/194
See application file for complete search history.

(56) References Cited

U.S. PATENT DOCUMENTS 10,810,543 B2 * 10/2020 Hsieh ................. G06Q 30/0627

FOREIGN PATENT DOCUMENTS

WO   WO-2019233394 A1 * 12/2019   ......... G06K 9/00671

OTHER PUBLICATIONS

Chen, et al. (Computer English translation of WO-2019233394, pp. 1-17. (Year: 2019).*

(Continued)

*Primary Examiner* — Daniel G Mariam
(74) *Attorney, Agent, or Firm* — von Briesen & Roper, s.c.

(57) ABSTRACT

Method for the prediction of labels associated with a digital image, comprising a prediction phase consisting of:
supplying the image to a segmentation neural network configured to predict a classification of the pixels of the image into a first set of classes; and
supplying at least part of this classification to a classification neural network configured to predict a set of labels for said image, based on the classification P of the pixels;
said segmentation and classification neural networks being determined by a learning phase comprising, for each image of a training set, the first and second steps; and determining a location of the background of said image, based on the classification of the pixels, and (Continued)

optimizing the weights of the neural networks according to a set of cost functions configured, by iteration, to maximize the quality of the set of labels as a function of labels previously established and associated with the image, and to maximize the probability of not predicting any label for the background.

12 Claims, 2 Drawing Sheets

(56) References Cited

OTHER PUBLICATIONS

International Search Report related to Application No. PCT/FR2021/051363; reported on Oct. 27, 2021.

Suo Qiu, et al., "Global Weighted Average Pooling Bridges Pixel-level Localization and Image-level Classification", arixiv.org, Cornell University Library, 201 Olin Library Cornell University Ithaca, NY 14853, Sep. 21, 2018, XP080919906, Section 1, Section III, Section VII, pp. 1-4.

Florian Dubost, et al., "Weakly Supervised Objection Detection with 2D and 3D Regression Neural Networks", arixiv.org, Cornell University Library, 201 Olin Library Cornell University Ithaca, NY 14853, Jun. 5, 2019, XP081625150, Section 1.2, Section 2.1.1., Section 2.2, Section 3.5, Section 6, Figure 2.

Shahriyar Shaikh Akib, et al., "An Approach for Multi Label Image Classification Using Single Label Convolutional Neural Network", 2018 21st International Conference of Computer and Information Technology (ICCIT), IEEE, Dec. 21, 2018, XP033512008, DOI: 10.1109/ICCITECHN.2018.8631970, Section III, pp. 1-6, Figure 7.

Gwenole' Quellec, et al., "ExplAIn: Explanatory Artificial Intelligence for Diabetic Retinopathy Diagnosis", arixiv.org, Cornell University Library, 201 Olin Library Cornell University Ithaca, NY 14853, Sep. 1, 2020, XP081752934.

* cited by examiner

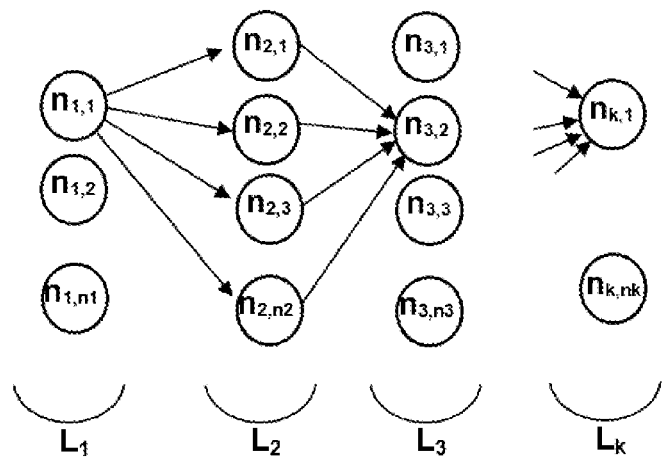
FIG. 5
FIG. 6
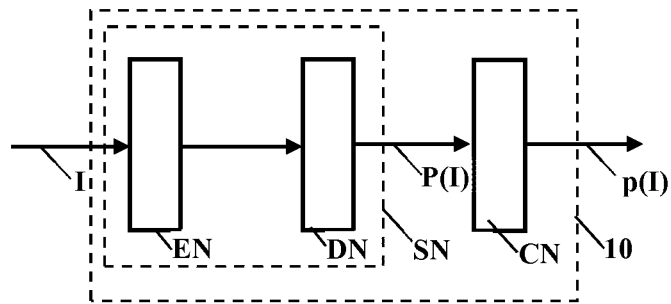
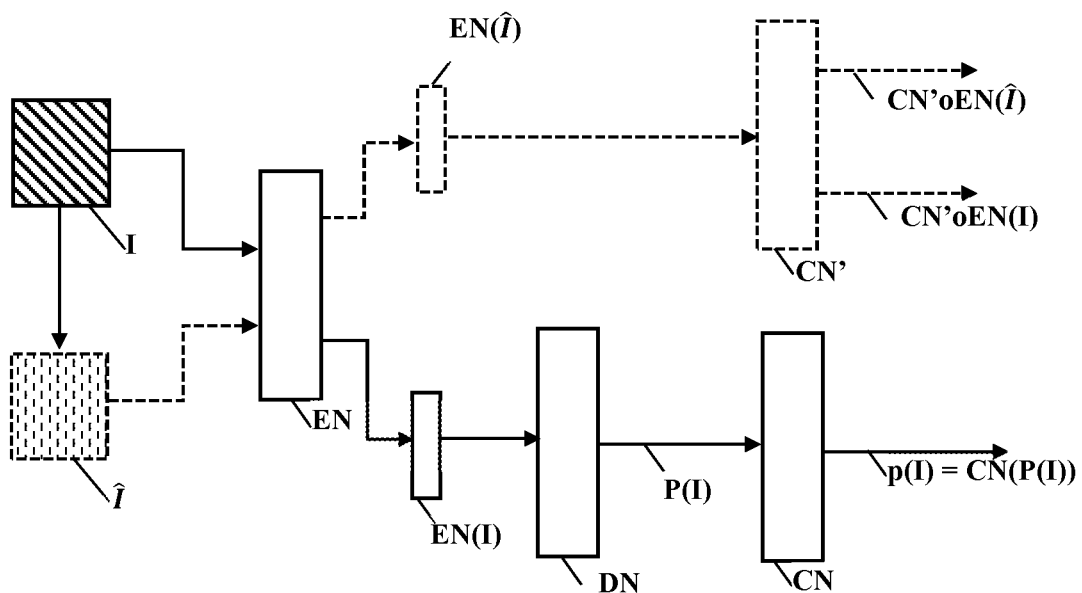
FIG. 7

PREDICTION OF LABELS FOR DIGITAL IMAGES, ESPECIALLY MEDICAL ONES, AND SUPPLY OF EXPLANATIONS ASSOCIATED WITH THESE LABELS

CROSS-REFERENCE TO RELATED APPLICATION

This Application is a 35 USC § 371 US National Stage filing of International Application No. PCT/FR2021/051363 filed on Jul. 21, 2021, and claims priority under the Paris Convention to French Patent Application No. 2007935 filed on Jul. 28, 2020.

FIELD OF THE DISCLOSURE

This invention relates to the prediction of labels, or labeling, to be associated with digital images. It applies in particular to the field of digital medical images in order to allow their use for automatic diagnosis or for assisting with diagnosis.

BACKGROUND OF THE DISCLOSURE

Artificial intelligence techniques, and in particular those related to multilayer neural networks, make it possible to process digital images automatically in order to associate them with labels, or classes, which may be predefined or determined dynamically on the basis of all of the processed images, during a learning phase.

Such an approach can, for example, make it possible to automatically associate diseases with medical images sourced from X-ray examinations, scans, tomographies, ultrasounds, MRI (Magnetic Resonance Imaging), etc.

It can also concern other fields of application for digital imaging such as video surveillance, vision for autonomous driving, etc., in which it involves characterizing, via these labels, a scene perceived by a camera, in order to possibly initiate an action (alert, automatic maneuver of the vehicle, etc.)

In general, these automatic systems are based on multilayer neural networks (usually convolutional neural networks). These can be considered as "black boxes", meaning that after a learning phase they are able to provide proposed labels, or classes, in response to a digital image, without the user being able to understand how this proposal, or prediction, was established and on what basis.

However, there is a need to be able to explain these predictions and to trace a causal chain between the inputs and outputs of an automatic system based on artificial intelligence.

Indeed, as such a system is not infallible, the user (for example the physician or surgeon in the case of medical imaging) will be able to analyze the "reasoning" of the automatic system, to understand the prediction, and to more easily accept it.

There is also a general trend towards providing explainable mechanisms for automatic classification. Various legislations have addressed this problem and are aimed at defining, promoting, or even imposing in certain sensitive areas, explainable automatic classification systems.

One of the advantages of this explainability is that certain regulations, including those of the European Union, aim to guarantee an explanation to the end users of artificial intelligence, for the automatic decisions which concern them. These aspects are described in particular in Goodman B, Flaxman S, "*European Union regulations on algorithmic decision-making and a right to explanation*" in AI Magazine, 2017 October; 38(3): 50-7.

In France, in its opinion published in June 2017 on the ethics of research in machine learning, the CERNA commission (Allistene commission on the ethics of research in digital sciences and technologies) defines the concept of explainability in the following way: "to explain an algorithm is to make its users understand what it does, with enough details and arguments to gain their confidence".

Since then, the design of explainable artificial intelligence mechanisms (XAI for "eXplainable Artificial Intelligence") has become a subject of research in which many actors are involved. Gilpin et al., "*Explaining explanations: An overview of interpretability of machine learning*" in Proc. IEEE DSAA, 2018, Torino, p. 80-89 provides an assessment of the current situation.

However, within this general concept one must distinguish between interpretability and true explainability.

An algorithmic decision is said to be explainable if it is possible to account for it explicitly from known data and characteristics of the situation. In other words, if it is possible to establish a relation between the values taken by certain variables (characteristics) and their consequences on the prediction, for example of a score, and thus on the decision.

An algorithmic decision is said to be interpretable if it is possible to identify the characteristics or variables that contribute the most to the decision, or even to quantify their importance.

By definition, an explainable decision is interpretable.

These definitions can be found in particular in the article by Gilpin et al., cited above.

Currently, there do not seem to be any mechanisms for achieving the required level of explainability without impacting its predictive qualities.

A first family of proposals is based on a retrospective analysis of the influence of image pixels on the prediction made by the automatic image classification mechanism. However, this approach does not allow precisely explaining the influences detected.

Another family of proposals is based on alternative methods to multilayer neural networks. For example, neural decision forests consisting of several neural decision trees have been proposed. Although each neural decision tree is explainable to some extent, the fact that the final decision is based on a large number of decision trees still renders this final decision opaque.

SUMMARY OF THE DISCLOSURE

An object of the present invention is to provide a mechanism which at least partially overcomes the above disadvantages.

More particularly, according to some embodiments, it aims to provide an automatic and explainable prediction of labels associated with a digital image.

To this end, according to a first aspect, the invention can be implemented by a method for the prediction of labels associated with a digital image, comprising a prediction phase consisting of:
  supplying, in a first step, said image to a segmentation neural network configured to predict a classification of the pixels of said image into a first set of classes; and
  supplying, in a second step, said classification to a classification neural network configured to predict a set of labels p(I) for said image, based on said classification of the pixels, except for a segment corresponding to a background of said image;

said segmentation and classification neural networks being determined by a learning phase comprising, for each image of a training set:

said first and second steps;

determining a location of said background of said image, based on the classification of the pixels;

optimizing the weights of said neural networks, according to a set of cost functions configured, by iteration, to maximize the quality of said set of labels as a function of labels previously established and associated with said image, and to maximize the probability of not predicting any label for said background.

According to preferred embodiments, the invention comprises one or more of the following features which may be used separately or in combinations of some of them or in a combination of all of them:

determining a location of the background of said image comprises determining an occluded image, based on the classification of the pixels, corresponding to the background of the image, said occluded image being defined by $\hat{I}=I \times P_1=\{I_{x,y} \cdot P_{1,x,y}, \forall (x, y)\}$, $(x, y)$ defining a pixel of said image.

during the learning phase, an auxiliary classification neural network is trained in order to optimize the classification of said occluded image.

said set of cost functions includes a total cost function $\mathcal{L}_{total}$ which is expressed as:

$$\mathcal{L}_{total} = \mathcal{L} + \alpha \cdot \mathcal{L}' + \beta \cdot \mathcal{L}_{occlusion} + \gamma \cdot \mathcal{L}_{sparsity} \qquad \text{[Math. 1]}$$

where $\mathcal{L}$ is a cost function which allows maximizing the quality of said set of labels on the basis of previously established labels;

$\mathcal{L}'$ is a cost function which allows maximizing the quality of the predictions of said auxiliary classification neural network on the basis of said previously established labels;

$\mathcal{L}_{occlusion}$ is a cost function which allows maximizing the probability of not predicting any label for said occluded image; and $\mathcal{L}_{sparsity}$ is a cost function which allows maximizing a surface area of said classification of the pixels of the background; and $\alpha$, $\beta$ and $\gamma$ are parameters.

said segmentation neural network is an encoder-decoder network formed of an encoder neural network and a decoder neural network, arranged in cascade.

said classification neural network is composed of summary and classification layers.

the output from said classification layer can be expressed as a function of an input vector $z_m$ $$\Delta(z) = \left\{ \sigma \left( \sum_{m=2}^{M} z_m w_{m,n}^2 + b_n \right), \forall n \in \{1, 2, \ldots, N\} \right\} \qquad \text{[Math. 2]}$$

with $w_{m,n}$ representing positive synaptic weights, $b_n$ representing biases, $\sigma$ representing the activation function for the neurons of said classification layer, N representing the number of image labels, and M the number of pixel labels.

during said prediction phase, an explanation associated with each label of said set of labels is provided.

said explanation is based on said synaptic weights $w_{m,n}$ of said classification layer and on the outputs from said summary layers.

at the end of the learning phase, names are associated with the probability maps, and said names are provided with said explanations during the prediction phase.

According to another aspect, the invention can also be implemented by a computer program comprising instructions for implementing the method described above when implemented by an information processing platform.

According to another aspect, the invention can also be implemented by a device for predicting labels associated with a digital image, comprising means for implementing the method as described above.

Other features and advantages of the invention will become apparent upon reading the following description of a preferred embodiment of the invention, given by way of example and with reference to the accompanying drawings.

BRIEF DESCRIPTION OF DRAWINGS

The accompanying drawings illustrate the invention:

FIG. 5 schematically illustrates a multilayer neural network as can be used in the context of implementing the invention.

FIG. 6 schematically illustrates a functional architecture according to one embodiment of the invention.

FIG. 7 schematically illustrates a functional architecture according to one embodiment of the invention comprising a learning phase.

DETAILED DESCRIPTION OF THE DISCLOSURE

According to one aspect of the invention, the prediction of labels associated with a digital image may be performed by a device which can be implemented by an information processing system.

Figure 1:
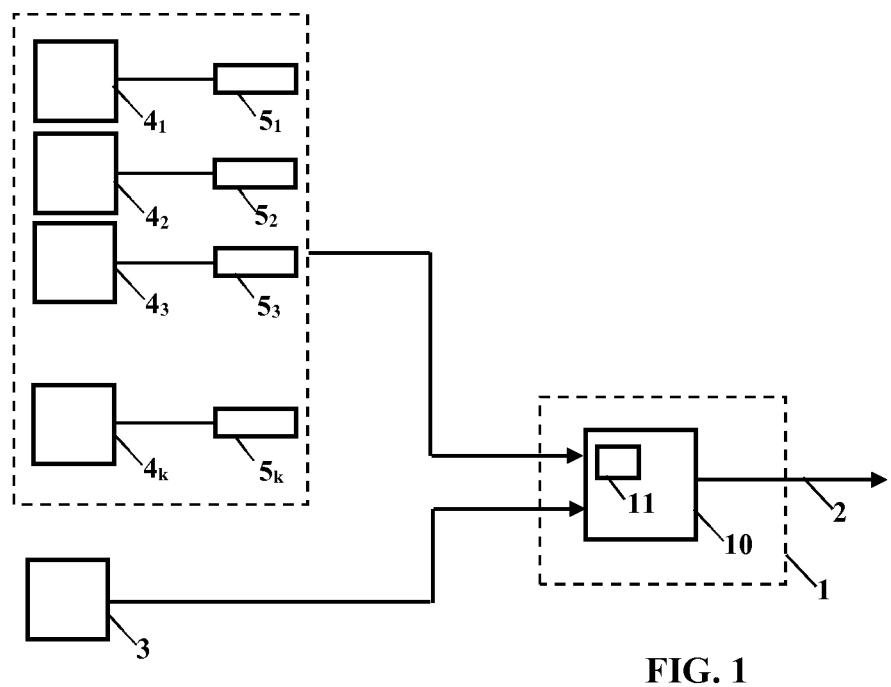
FIG. 1 schematically represents an example of the context in which the invention can be implemented.

This system may in particular be as illustrated in FIG. 1.

In a first phase, called a learning or learning phase, a set 4 of digital images $4_1, 4_2, 4_3 \ldots 4_k$ is presented to a computer program 10 implementing the method according to one embodiment of the invention. In addition, previously established labels 5 are also provided, respectively $5_1, 5_2, 5_3 \ldots 5_k$. These labels may have been established manually by human operators, or possibly by other processes.

According to one embodiment, these images are two-dimensional digital images. In particular, they may be medical digital images sourced from x-ray examinations, scans, tomographies, ultrasounds, MRI (Magnetic Resonance Imaging), etc.

However, the invention can be applied to images of other dimensions, in particular to 1 dimension or 3 dimensions or more.

The learning phase makes it possible to build a model 11, formed from internal parameters (synaptic weights, etc.) of the neural networks implemented by computer program 10.

These neural networks 11, once trained, can be used during an exploitation or prediction phase: a new image 3 is provided to computer program 10 which can then determine a prediction of labels 2.

Computer program 10 can be implemented by an information processing device 1. According to one embodiment of the invention, the information processing device can be of different types (personal computer, server, communication terminal, service available via cloud computing, etc.).

According to one embodiment, the device can be implemented by a set of circuits co-located in a centralized server or distributed within a distributed server or across a set of servers. This set of servers may include "server farm" or "cloud computing" types of arrangements.

Figure 2:
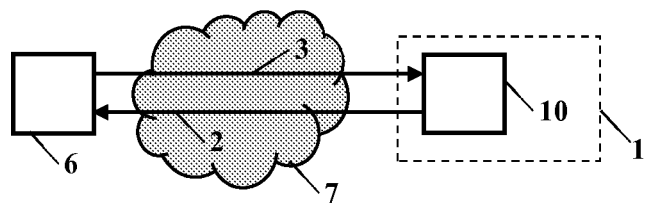
FIG. 2 schematically represents another example of the context in which the invention can be implemented.

In particular, according to an embodiment such as the one illustrated in [FIG. 2] for example, computer program 10 can be accessed remotely through a communication network 7. Thus, for example, a communication terminal 6 can send an image 3 to a label prediction device 1 via communication network 7 and receive a prediction 2 of labels in response. As mentioned above, this device can be a single server, or, in a more abstract manner, a service made accessible via an interface, in particular of the web type and deployed on a cloud computing type of abstraction platform.

For the practical implementation of the label prediction device, the term "circuit" is understood in this application as comprising hardware elements possibly associated with software elements to the extent that certain hardware elements can be programmed. In particular, the term circuit comprises purely hardware implementations, in the form of specifically printed digital or analog circuits, implementations based wholly or partially on microprocessor or processor types of elements, which are programmed by software instructions stored in one or more associated memories, etc. The software instructions may consist only of the instructions necessary for the basic operations of the processors ("firmware") while the software instructions necessary for carrying out the functions of the embodiments of the invention may be stored either in these same memories associated with the processors or in remote memories. In the latter case, these software instructions are only present in the circuit when the circuit is operating in order to perform the functions according to the embodiments of the invention.

Figure 3:
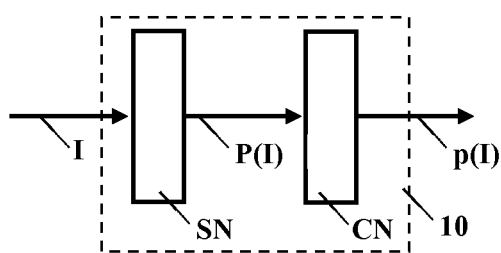
FIG. 3 schematically illustrates a functional architecture according to one embodiment of the invention.

According to one aspect of the invention, as illustrated in [FIG. 3], label prediction device 10 comprises a first segmentation neural network SN, and a second classification neural network CN.

Figure 4:
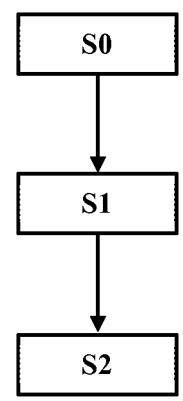
FIG. 4 schematically illustrates a functional flowchart according to one embodiment of the invention.

FIG. 4 illustrates this process in two steps in flowchart form: a first step S1 allows predicting a classification of the pixels of the image based on the image itself, and a second step S2 allows predicting a classification of the image based on the pixels' classification. These two steps are based on neural networks that have been trained during a learning phase S0.

From a highly macroscopic viewpoint, multilayer neural networks can be viewed as black boxes whose internal parameters must be adjusted during a training or learning phase, by presenting them with both input data and a desired output (i.e., here, previously established labels). The error between this desired output and the "natural" output of the network allows slightly adjusting the parameters in order to decrease the error. By presenting a large number of these "input data/desired output" pairs, the network learns to react correctly and to provide good output when presented with new input data not associated with previously established labels (and therefore needing to be predicted).

According to one embodiment of the invention, the neural network used can be based on a multilayer perceptron. Among the networks based on the general architecture of the multilayer perceptron, mention may be made in particular of convolutional neural networks (ConvNet or CNN).

The multilayer perceptron (MLP) is a type of artificial neural network organized into several layers, in which information flows from input layer $L_1$ to output layer $L_k$ only; it is therefore a direct feedforward network. Each layer $L_1, L_2, L_3 \ldots L_k$ is composed of a variable number of neurons, respectively $n_1, n_2, n \ldots n_k$. The neurons of the last layer ("output layer") are the outputs of the neural network and representative of a prediction of the model in response to an input provided to layer $L_1$.

In a multilayer perceptron, the output of each neuron $n_{i,j}$ is connected to all the neurons of the next layer $L_{i+}$. Conversely, it receives as input the outputs of all neurons of the previous layer $L_{i-1}$. In [FIG. 5], for clarity, only a few connections are represented by directed arrows.

Each connection is associated with a weight (or synaptic weight). The set of weights forms the internal parameters of the neural network. They must be determined during a learning phase (or training), and then allow predicting output values, by generalization, from a new input vector presented to input layer $L_1$.

Conventionally, each neuron $n_{i,j}$ sums these inputs weighted by the weights of the associated connections and then applies an activation function to this sum.

Several techniques exist for determining the internal parameters of the network, in particular the synaptic weights, by learning. Mention may be made in particular of the Stochastic Gradient Descent (SGD) algorithm, described for example in LeCun, Yann A., et al. "*Efficient backprop. Neural networks: Tricks of the trade*", Springer Berlin Heidelberg, 2012, 9-48. One can also cite ADAM, originally described in Diederik P. Kingma and Jimmy Lei Ba. "*Adam: A method for stochastic optimization*" 2014, arXiv: 1412.6980v9, or RMSprop, described in particular in Tijmen Tieleman and Geoffrey Hinton, "*Lecture 6.5-rmsprop: Divide the gradient by a running average of its recent magnitude*", COURSERA: neural networks for machine learning, 4(2): 26-31, 2012.

According to one aspect of the invention, the first neural network is a segmentation neural network, SN, configured to predict a classification P(I) of the pixels of image I.

According to one embodiment, classification P(I) associates with each pixel (x,y) of image I a vector $P_{x,y}$ representing the set of predictions $P_{m,x,y}$ of pixel (x,y) to be associated with label m∈ {0, 1, . . . , M}, where M is the possible number of labels for the image pixels. We can write $P_{m,x,y} \in [0; 1]$.

In other words, P(I) forms a three-dimensional tensor. We can also define this classification as a set of M probability maps $P_m$, with m∈ {0, 1, . . . , M}, representing the prediction for each of the pixels (x,y) of the image to be associated with label m.

According to one embodiment, the pixel labels are considered to be mutually exclusive. We can therefore write:

$$\sum_{m=1}^{M} P_{m,x,y} = 1 \qquad \text{[Math. 3]}$$

This classification P(I) defines a segmentation of the image, i.e. a set of groups of pixels, or image segments, each segment corresponding to a distinct class. As will be seen below, one of the challenges of certain embodiments of the invention consists of conferring a semantic meaning to these classes. This meaning, associated with each class, will then make it possible to explain the prediction of image labels.

Classification P(I) of the pixels, predicted by segmentation network SN, is then provided to a classification network CN, configured to predict a set of labels p(I) for said image, based on this classification of pixels.

According to one embodiment, classification p(I) associates with image I a vector of predictions $p_n \in [0; 1]$ with $n \in \{0, 1 \ldots N\}$, N being the number of labels that can be associated with image I. Each value $p_n$ of vector p(I) indicates a probability that the image is associated with label n.

According to one embodiment, the labels are not mutually exclusive, i.e. several labels can be predicted for a same image I.

During learning phase S0, which will be detailed below, we consider, for each image of the training set, a vector $\delta(I)$ of labels $\delta_n \in \{0,1\}$. We can then write:

$$\sum_{n=1}^{N} \delta_n \in \{0, 1, \ldots, N\} \qquad \text{[Math. 4]}$$

The number N of labels for the images I and the number M of labels for the pixels can be different.

According to one embodiment of the invention, one particular probability map $P_1$ (label m=1) is considered to be representative of the background of the image.

According to one embodiment, segmentation neural network SN is implemented by an encoder-decoder network. As illustrated in [FIG. 6], such an encoder-decoder network can be broken down into an encoder neural network EN and a decoder neural network DN, arranged in cascade so that the outputs of the first network EN are provided as input to the second network DN.

Such an architecture is for example described in Ronneberger, O., Fischer, P., Brox, T., "*U-net: Convolutional networks for biomedical image segmentation*", in Proc. MICCAI, October 2015, Munich, pp. 234-241. This approach consists of transforming the input data by encoding them in an intermediate vector which represents a set of internal states, then decoding this intermediate vector by "projecting" it towards an output vector, here the predictions of pixel labels P(I).

We can write SN=DN o EN, where "o" is the function combination operator, and SN, DN, EN represent the functions respectively associated with neural networks SN, DN, EN.

According to one embodiment of the invention, encoder network EN can be the EfficientNet network, as defined in the article "*EfficientNet: Rethinking model scaling for convolutional neural networks*" by Tan, M., Le, Q. V., in Proc. ICML, June 2019. This EfficientNet network is a convolutional neural network (CNN).

According to one embodiment of the invention, segmentation network SN is defined as a "Feature Pyramid Network" (FPN) as in the article "*Feature Pyramid Networks for object detections*" by Lin T. Y., Dollar, P., Girshick, R., He, K., Hariharan, B., Belongie, S., in Proc. CVPR, p. 936-944, July 2017.

This type of pyramid network is used in pattern recognition in digital images in order to detect objects or features regardless of their scale of representation in the image. It is based on a convolutional network, which conventionally can be ResNet or some other network.

In particular, feature maps are produced at different resolutions. These maps are then resized to the resolution of the considered image I and then concatenated. A final convolution layer then makes it possible to obtain tensor P(I).

Other types of encoder-decoder neural networks can of course be used to implement segmentation network SN. The FPN network was chosen for its speed of convergence and for its performance related to its independence from the resolution of the detected features (and which are used for the prediction of pixel labels). In particular, other types of network may be chosen according, for example, to the application context or the availability of new neural network architectures.

In the event that the pixel labels are mutually exclusive, one can use a softmax activation function µ for the last convolutional layer:

$$\mu(z) = \left\{ \frac{e^{z_m}}{\sum_{i=1}^{M} e^{z_i}}, \forall m \in \{1, 2, \ldots, M\} \right\} \qquad \text{[Math. 5]}$$

As output from decoder network DN, we therefore obtain a tensor P(I) expressing the classification of the pixels of image I.

This tensor can be viewed as a set of M probability maps $P_m$. Each probability map $P_m$ corresponds to a "segment" of the image, i.e. to a set of pixels (x,y) which are considered as corresponding to a same semantic value. Each value $P_{m,x,y}$ corresponds to the probability of pixel x,y being associated with label m, and therefore of belonging to the segment corresponding to map $P_m$.

These probabilities $P_{m,x,y}$ form the input data of classification network CN which will be explained below.

As mentioned above, one can assume that each pixel (x,y) is only associated with one class and that pixel labels are mutually exclusive. In other words, based on tensor P(I), one can assign a unique class to each pixel by choosing the index m which maximizes the value of $P_{m,x,y}$ for pixel (x,y). In this binarized tensor $\overline{P}_1$, each pixel (x,y) is associated with a non-zero value $\overline{P}_{m,x,y}$ of tensor $\overline{P}_1$ for only one value of $m \in \{1, 2, \ldots, M\}$.

As will be seen below, segmentation neural network SN is trained so that one of these probability maps, arbitrarily $P_1$, corresponds to the background of image I. The other probability maps therefore form the foreground of image I.

The classification resulting from segmentation network SN, formed by these other probability maps $P_m$ with $m \in \{2, 3, \ldots, M\}$, is then provided to a classification neural network CN.

This classification network is configured to predict a set of labels p(I) for image I based on the classification P of the pixels.

We can write p(I)=CN(P(I))=(CN o SN)(I), where "o" is the function combination operator.

According to one embodiment, classification neural network CN is chosen to be simple in order to facilitate the explainability of predictions p(I).

In particular, it may comprise two layers: a "summary" layer Π and a classification layer Δ.

The summary layer aims to represent each probability map $P_m$ by a unique value.

Various implementations are possible for determining this unique value.

According to one embodiment, this unique value may be the average, which is proportional to the surface area covered by each pixel label.

According to one embodiment, this unique value can be the maximum value of the map over all pixels x,y. We can then write:

$$\Pi(P)=\{\max_{x,y}(P_{m,x,y}), \forall m \in \{2,3,\ldots,M\}\} \quad \text{[Math. 6]}$$

Since the first embodiment can cause problems of over-segmentation, the second embodiment is preferred.

According to one embodiment, classification layer $\Delta$ can be a set of dense layers in which the synaptic weights are positive. According to another embodiment, the classification layer can be implemented by a differentiable decision tree.

According to one embodiment, the classification layer comprises only a single dense layer, with positive weights. Having only a single layer improves the explainability of the image predictions. Similarly, the positivity constraint allows explainability for the contribution of each pixel label $m \in \{2, 3, \ldots, M\}$: the prediction of image labels p(I) is defined as a weighted sum of the maximum predictions for each pixel label, each maximum prediction being weighted by a positive weight that can be interpreted as a level of confidence.

This classification layer $\Delta$ can be defined by:

$$\Delta(x) = \left\{ \sigma\left(\sum_{m=2}^{M} z_m w_{m,n}^2 + b_n\right), \forall n \in \{1, 2, \ldots, N\} \right\} \quad \text{[Math. 7]}$$

$w_{m,n}^2$ representing positive synaptic weights, $b_n$ representing biases, and $\sigma$ being an activation function; $z_m$ representing the inputs, i.e. the output or value of the neurons of the previous layer $\Pi$.

To the extent that the image labels are not mutually exclusive, one can choose the sigmoid function as the activation function $\sigma$:

$$\sigma(z) = \frac{1}{1+e^{-z}} \quad \text{[Math. 8]}$$

We thus obtain N predictions of image labels as output, among which a set of labels can be determined on the basis of the $p_n$ value.

In particular, we can choose among the $p_n$ values those that exceed a predefined threshold, or the few best, etc.

The $p_n$ value associated with each label quantifies a degree of confidence, or likelihood. It can be presented to the user in the results as an indicator.

According to one embodiment, in order to improve the explainability of the image label predictions made, a learning phase S0 is established that is configured to assign a semantic value to probability maps $P_m$.

As mentioned above and as shown in [FIG. 1], learning phase S0 consists of providing images $4_1, 4_2, 4_3 \ldots 4_k$ from a training set 4. Each of these images is associated with previously established image labels, respectively $5_1, 5_2, 5_3 \ldots 5_k$. Here, k is the cardinality of training set 4.

One of the aspects of the invention consists of allowing learning and determining the set of parameters of the neural networks, in order to improve the explainability of predictions $p_m$ while maintaining good performance in prediction and convergence.

One difficulty in designing a mechanism for implementing this learning phase is that although we can have previously established labels $\delta(I)$ for the images, we cannot have such previously established labels for the pixels.

To achieve this, as mentioned above, segmentation neural network SN can be trained so that one of these probability maps, arbitrarily $P_1$, corresponds to the background of image I. The other probability maps therefore form the foreground of image I.

FIG. 7 illustrates the sequence of functional steps according to one embodiment of the invention. The solid arrows illustrate the sequences implemented in prediction (or exploitation) phases S1, S2, while the dotted arrows and blocks illustrate those implemented only during training phase S0.

Thus, for any image I of the training set, the previously described steps of predicting a classification P of the pixels, by segmentation network SN, then of predicting a set of labels p(I) for the image based on classification P of the pixels, by classification network CN, are carried out.

A constraint that must be respected by the neural network is defined:

If a background image I is provided, i.e. with which no image label is associated, or for which $$\sum_{n=1}^{N} \delta_n = 0 \quad \text{[Math. 9]}$$

Then segmentation network SN only has to predict labels for background pixels, i.e. from probability map $P_1$.

In order to satisfy this constraint, the method therefore comprises determining a location of the background of the image, based on classification P(I) of the pixels. The location corresponds to the composition of a segment of images corresponding to the background. This background, as will be seen below, corresponds to areas with no semantic value and which therefore cannot be used for the prediction of image labels.

In particular, according to one embodiment, this location determination comprises determining an occluded image $\hat{I}$ from classification $P_1$ of the pixels, corresponding to the background of the image.

According to one embodiment, the weights of said neural networks are optimized according to a set of cost functions configured to maximize, by iterating over the images of the training set, the quality of said set of labels p(I) on the basis of labels previously established and associated with said image, and to maximize the probability of not predicting any label for said occluded image.

This occluded image $\hat{I}$ can be determined as follows:

$$\hat{I} = I \times P_1 = \{I_{x,y} \cdot P_{1,x,y}, \forall (x,y)\} \quad \text{[Math. 10]}$$

This product can be done element by element, in the case of an image with several planes, in particular a color image.

An occlusion mechanism is described in a different context in the article "*Visualizing and understanding convolutional networks*" by M. D. Zeiler, R. Fergus, in Proc. ECCV, pp. 818-833, September 2014. In this article, a square mask is moved over the image and, for each position of the mask, an occluded image is created and processed by the classification network. The positions of the mask which disrupt the classification are then retained.

The occlusion mechanism described can be considered as an improvement to the one proposed by M. D. Zeiler and R. Fergus in which the mask is adapted to each image and therefore a unique occluded image to be processed by the classification network is obtained. This approach allows a gain in speed (only one inference) and precision (pixel scale rather than that of the square mask). Furthermore, contrary to what is described in that article, the occlusion mechanism implemented according to one embodiment of the invention is only performed during learning phase S0. Also, it is implemented only in order to optimize the learning of probability map $P_1$.

Thus, the learning aims to process image I with the goal of assigning it the correct image label(s) p(I), and aims to process occluded image Î with the goal of not assigning it any label, which conveys the fact that all relevant pixels are indeed occluded.

In the case of medical imaging, we thus obtain a probability map $P_1$ optimized so that all the lesions are removed from occluded image Î.

The occluded image must satisfy two properties that must be optimized during the learning phase:
  (i) the occluded image must always be perceived as a background image, regardless of the labels previously established for image I. This indicates that all relevant pixels have been correctly occluded (sensitivity property of the occlusion);
  (ii) probability map $P_1$ must represent as large a surface area as possible. In other words, the complementary image must be as sparse as possible, i.e. it must contain pixels that are as sparse as possible (specificity property of the occlusion).

In order to optimize the first property (i), occluded image Î must be provided to a classification neural network CN', and background map $P_1$ must be optimized by learning, so that Î is predicted as the background.

According to one embodiment, neural networks CN o SN can be used to do this. However, optimization of (CN o SN) Î) will not only impact the detection of background pixels but also the whole classification.

Also, according to one embodiment, a classification neural network CN' is implemented during the learning phase, in order to isolate the two convergences in an auxiliary classification branch.

It should be noted that the use of such an additional classification neural network and an auxiliary classification branch are not essential. This proposed optimization makes it possible to increase the image segment corresponding to the background, and in doing so to reduce the foreground in which the areas of interest are searched for. The goal is to optimize the method and the synaptic weights of the neural networks in order to better pinpoint the lesions that one wishes to determine in the digital images. The absence of these features will nevertheless allow such determination, with an equally high (or even higher) correct label prediction rate, but with less precision at the pixel level.

It can be assumed that encoder network EN performs a separation of the background and foreground, so it can be used for background optimization. The auxiliary classification branch therefore consists of networks EN and CN', i.e. (CN' o EN). The reuse of encoder network EN makes it possible in particular to reduce the complexity of the training.

The "top activation" layer produces the tensor at the boundary between the encoder part and the decoder part of segmentation network SN. We consider that the information of the highest semantic level is to be found in this tensor, and therefore the information best suitable for classification of the image. Also, auxiliary classification neural network CN' can take as input the tensor that is output from encoder network EN, i.e. the tensor produced by the "top activation" layer.

Auxiliary classification neural network CN' can be composed of a "global average pooling" type of layer (global average of activation maps), followed by a conventional dense layer. As with classification network CN, this auxiliary network has non-mutually exclusive output.

If T=EN(I), the output from network CN'(T) can be written:

$$CN'(T) = \left\{ \sigma\left( \sum_{l=1}^{L} \frac{\sum_{x,y} T_{l,x,y}}{\sum_{x,y} 1} w'_{l,n} + b'_n \right), \forall n \in \{1, 2, \ldots, N\} \right\} \quad \text{[Math. 11]}$$

where $\sigma$ is the sigmoid function, previously described, and $w'_{l,n}$ and $b'_n$ respectively represent the synaptic weights and biases, and L is the number of components of the input layer (or output from encoder network EN).

Branch CN' o EN therefore forms a classification branch for classifying the occluded images, in order to optimize the classification of background images.

In order to allow proper optimization of the synaptic weights (and biases) during learning phase S0, cost functions (or "loss functions") must also be defined.

The main purpose of the proposed mechanism is to properly classify the image labels. A cost function is therefore defined in order to measure the convergence between the label predictions p(I) provided and the labels previously established 8 (I), with $$\delta(I) = \{\delta_{I,n}, \forall n \in \{1, 2, \ldots, N\}\} \quad \text{[Math. 12]}$$

We can use a cost function $\mathcal{L}$ based on cross-entropy. This can be defined by:

$$\mathcal{L} = -\frac{1}{N \cdot \sum_I 1} \sum_I \sum_{n=1}^{N} [\delta_{I,n} \log(CNoSN(I)_n) + (1 - \delta_{I,n}) \log(1 - CNoSN(I)_n)] \quad \text{[Math. 13]}$$

with p(I)=CNoSN(I).

For auxiliary classification branch CN'oEN, a cost function $\mathcal{L}$ also based on cross-entropy can be defined. It can be defined, in the same manner as cost function $\mathcal{L}$, by the equation:

$$\mathcal{L}' = -\frac{1}{N \cdot \sum_I 1} \sum_I \sum_{n=1}^{N} [\delta_{I,n} \log(CN'oEN(I)_n) + (1 - \delta_{I,n}) \log(1 - CN'oEN(I)_n)] \quad \text{[Math. 14]}$$

Another cost function is defined in order to optimize the learning of auxiliary classification network CN' so that it converges towards satisfying the first property of occluded image Î (sensitivity of the occlusion).

For a background image, we can write:

$$\sum_{n=1}^{N} \delta_{I,n} = 0 \quad \text{[Math. 15]}$$

This expression indicates that no image label is assigned to a background image. Typically, in the case of medical imaging, this means that no disease can be associated with an image that does not include lesions.

Cost function $\mathcal{L}_{occlusion}$ which allows optimizing the sensitivity of the occlusion, can be based on a Euclidean norm. It can for example be written:

$$\mathcal{L}_{occlusion} = \frac{\sum_I \sum_{n=1}^{N} [CN'oEN(\hat{I})_n]^2}{N \cdot \sum_I I} \quad [\text{Math. 16}]$$

Another cost function, $\mathcal{L}_{sparsity}$ can be defined in order to control the training of neural network SN in order to optimize satisfying the second property of the occluded image (i.e. the specificity property of the occlusion).

This cost function makes it possible to maximize a surface area of classification $P_1$ of the pixels or, conversely, to minimize that of the classification of the foreground pixels.

This cost function $\mathcal{L}_{sparsity}$ can for example be a norm 1 on the predictions of probability maps $P_m$ with $m \in \{2, 3, \ldots, M\}$, provided by neural network SN. This cost function can be written:

$$\mathcal{L}_{sparsity} = \frac{\sum_I \sum_x \sum_y |\sum_{m=2}^{M} SN(I)_{m,x,y}|}{\sum_I \sum_x \sum_y 1} \quad [\text{Math. 17}]$$

The set of cost functions may further include a total cost function $\mathcal{L}_{total}$. This total cost function can be based on all the previously described cost functions and serve for the convergence of the different neural networks during the learning phase.

Thus, this total cost function $\mathcal{L}_{total}$ can therefore be used at each iteration on the training set, and can be expressed for example as:

$$\mathcal{L}_{total} = \mathcal{L} + \alpha \cdot \mathcal{L}' + \beta \cdot \mathcal{L}_{occlusion} + \gamma \cdot \mathcal{L}_{sparsity} \quad [\text{Math. 18}]$$

where $\alpha$, $\beta$ and $\gamma$ are parameters regulating the respective contributions of the different cost functions in the total cost function $\mathcal{L}_{total}$.

This total cost function allows convergence by back-propagating the gradients of the errors determined by the cost function in order to determine, iteratively, the synaptic weights of the different neural networks, so as to optimize the different constraints measured by contributions $\mathcal{L}$, $\mathcal{L}'$, $\mathcal{L}_{occlusion}$, and $\mathcal{L}_{sparsity}$.

Parameters $\alpha$, $\beta$ and $\gamma$ can be determined experimentally. It turns out that parameter $\gamma$ is the most sensitive and can be used to adjust a trade-off between the quality of the image classification (assignment of image labels) and the quality of the pixel classification (assignment of pixel labels), allowing explainability.

As said before, the assignment of pixel labels P(I) as well as the exclusive support for the prediction of image labels p(I) on these pixel labels P(I) allows explainability of the image label predictions. Indeed, it may be sufficient to consider the contributions of prediction maps P(I) having led to a prediction p(I) in order to provide a user with a good (i.e. semantic) understanding of the elements having led to the prediction: these prediction maps can be displayed, if necessary, so as to show explicitly the sets of pixels that allowed the prediction. Each set of pixels normally corresponds to a single lesion, if the classification has gone well.

According to one embodiment, when an image I is provided, by inference a prediction p(I) is obtained which is a vector of N label predictions $p_n$, as well as M−1 probability maps $P_m$ for the pixel labels.

According to one embodiment of the invention, during the prediction phase, an explanation associated with each label of the set of labels is provided. It is thus possible for a user to understand the reasons that led to assigning the labels to the digital images.

According to one embodiment, these explanations can be based both on the pixel labels (i.e. the probability maps) as well as on the synaptic weights $w_{m,n}$ of the classification layers A. These synaptic weights indicate the contribution of each pixel label in the assignment of image labels.

According to one embodiment, the following procedure can be implemented:

The M−1 pixels that maximize the prediction of probability maps $P_m$ can be presented to the user.

The intensities, or values, (positive) of these pixels are denoted as $i_2, i_3 \ldots i_M$. In order to explain image label prediction $p_n$, these intensities can be respectively multiplied by the (also positive) weights $w_{2,n}^2$, $w_{3,n}^2$, $w_{4,n}^2 \ldots w_{M,n}^2$. Each product $w_{2,n}^2 \cdot i_m$ is representative of the weight of pixel label m in prediction $p_n$.

At the end of learning phase S0, experts can also indicate names to probability maps $P_m$. In which case, these names can be used to indicate the causes of prediction $p_n$ in addition to or instead of the associated pixel label number m.

The mechanism has been described in the article by Gwenolé Quellec, Hassan Al Hajj, Mathieu Lamard, Pierre-Henri Conze, Pascale Massin, Béatrice Cochener, "ExplAIn: Explanatory artificial intelligence for diabetic retinopathy diagnosis" in Medical Image Analysis, Volume 72, 2021, ISSN 1361-8415.

This article in particular presents experimental results of the method described. These show in particular that the rules found by the architecture based on neural networks are consistent with the classification by human experts (see Table 3).

Of course, the invention is not limited to the examples and the embodiment described and represented, but is defined by the claims. In particular it is capable of many variants accessible to those skilled in the art.

The invention claimed is:

1. A method for the prediction of labels associated with a digital image, comprising a prediction phase consisting of:
   supplying, in a first step S1, said image to a segmentation neural network configured to predict a classification P of the pixels of said image into a first set of classes; and
   supplying, in a second step S2, said classification to a classification neural network configured to predict a set of labels p(I) for said image, based on said classification P of the pixels, except for a segment corresponding to a background of said image;
   said segmentation and classification neural networks being determined by a learning phase comprising, for each image of a training set;
   performing said first step S1 and second steps S2;
   determining a location of said background of said image, based on the classification of the pixels; and
   optimizing the weights of said neural networks, according to a set of cost functions configured, by iteration, to maximize the quality of said set of labels p(I) as a function of labels previously established and associated with said image, and to maximize the probability of not predicting any label for said background.

2. The method according to claim 1, wherein the determination of a location of the background of said image comprises the determination of an occluded image Î, based on the classification $P_1$ of the pixels, corresponding to the background of the image, said occluded image being defined by $Î=I\times P_1=\{I_{x,y}\cdot P_{1,x,y}, \forall(x,y)\}$, (x, y) defining a pixel of said image.

3. The method according to claim 2, wherein, during the learning phase, an auxiliary classification neural network (CN') is trained in order to optimize the classification of said occluded image.

4. The method according to claim 3, wherein said set of cost functions includes a total cost function $\mathcal{L}_{total}$ Which is expressed as:

$\mathcal{L}_{total}=\mathcal{L}+\alpha\cdot\mathcal{L}'+\beta\cdot\mathcal{L}_{occlusion}+\gamma\cdot\mathcal{L}_{sparsity}$ where
- L is a cost function which allows maximizing the quality of said set of labels p(I) on the basis of previously established labels;
- L' is a cost function which allows maximizing the quality of the predictions of said auxiliary classification neural network (CN') on the basis of said previously established labels;
- $L_{occlusion}$ is a cost function which allows maximizing the probability of not predicting any label for said occluded image; and
- $L_{sparsity}$ is a cost function which allows maximizing a surface area of said classification $P_1$ of the pixels; and
- α, β and γ are parameters.

5. The method according to claim 1, wherein said segmentation neural network is an encoder-decoder network formed of an encoder neural network (EN) and a decoder neural network (DN), arranged in cascade.

6. The method according to claim 1, wherein said classification neural network (CN) is composed of summary layers Π and classification Δ layers.

7. The method according to claim 6, wherein the output from said classification layer Δ can be expressed as a function of an input vector $z_m$, Δ being expressed as:

$$\Delta(z) = \left\{\sigma\left(\sum_{m=2}^{M} z_m w_{m,n}^2 + b_n\right), \forall n \in \{1, 2, \ldots, N\}\right\}$$

with $w_{m,n}$ representing positive synaptic weights, σ representing the activation function for the neurons of said classification layer, N representing the number of said labels, and $b_n$ representing biases.

8. The method according to claim 7, wherein an explanation associated with each label of said set of labels is provided during said prediction phase.

9. The method according to claim 8, wherein said explanation is based on said synaptic weights $w_{m,n}$ of said classification layer Δ and on the outputs from said summary layers Π.

10. The method according to claim 7, wherein, at the end of the learning phase, names are associated with the probability maps $P_m$, and said names are provided with said explanations during the prediction phase.

11. A device for predicting labels associated with a digital image, comprising a computer configured for implementing the method according to claim 1.

12. A non-transitory computer readable storage medium having stored thereon code instructions which, when executed by a computer, cause said computer to carry out the method according to claim 1.

* * * * *